(12) United States Patent
Miyata (10) Patent No.: US 12,468,133 B2
(45) Date of Patent: Nov. 11, 2025

(54) LIGHT SOURCE DEVICE, OPTICAL LENS, AND METHOD OF MANUFACTURING OPTICAL LENS

(71) Applicant: NICHIA CORPORATION, Anan (JP)

(72) Inventor: Tadaaki Miyata, Yokohama (JP)

(73) Assignee: NICHIA CORPORATION, Anan (JP)

( * ) Notice: Subject to any disclaimer, the term of this patent is extended or adjusted under 35 U.S.C. 154(b) by 1081 days.

(21) Appl. No.: 17/198,086

(22) Filed: Mar. 10, 2021

(65) Prior Publication Data

US 2021/0286158 A1 Sep. 16, 2021

(30) Foreign Application Priority Data

Mar. 12, 2020 (JP) .................................. 2020-042690

(51) Int. Cl.
G02B 1/10 (2015.01)
G02B 1/11 (2015.01)
G02B 1/115 (2015.01)
G02B 19/00 (2006.01)

(52) U.S. Cl.
CPC ............ *G02B 19/0028* (2013.01); *G02B 1/11* (2013.01); *G02B 1/115* (2013.01); *G02B 19/0033* (2013.01)

(58) Field of Classification Search
CPC ............................ G02B 19/0028; G02B 1/115; G02B 19/0033; F21S 41/176
USPC .............................. 362/19; 359/580, 581, 596
See application file for complete search history.

(56) References Cited

U.S. PATENT DOCUMENTS

| 6,243,203 B1 * | 6/2001 | Schleipen | G02B 1/115 359/359 |
| 10,941,916 B2 * | 3/2021 | Minami | F21S 41/285 |
| 2013/0188051 A1 * | 7/2013 | Ishigaki | G06T 5/40 348/148 |
| 2015/0323144 A1 * | 11/2015 | Naka | H01S 5/4087 362/19 |

FOREIGN PATENT DOCUMENTS

| JP | H10-034507 A | 2/1998 |
| JP | H10162409 A | 6/1998 |
| JP | H10-208275 A | 8/1998 |
| JP | 2001-176113 A | 6/2001 |
| JP | 2004-145003 A | 5/2004 |
| JP | 2004271658 A | 9/2004 |
| JP | 2010-205322 A | 9/2010 |
| JP | 2013-105143 A | 5/2013 |
| JP | 2013-114724 A | 6/2013 |
| JP | 2013142759 A | 7/2013 |
| JP | 2017-083907 A | 5/2017 |

* cited by examiner

*Primary Examiner* — Audrey Y Chang
(74) *Attorney, Agent, or Firm* — Global IP Counselors, LLP (57) ABSTRACT

A light source device includes a condensing lens, a laser light source, a first anti-reflection film, and a second anti-reflection film. The condensing lens has a curved surface. The laser light source includes a plurality of laser elements configured to emit laser beams incident on different regions of the curved surface of the condensing lens. The first anti-reflection film and the second anti-reflection film are disposed in different regions of the curved surface. The first anti-reflection film has a reflectance characteristic different from a reflectance characteristic of the second anti-reflection film.

15 Claims, 8 Drawing Sheets

LIGHT SOURCE DEVICE, OPTICAL LENS, AND METHOD OF MANUFACTURING OPTICAL LENS

CROSS-REFERENCE TO RELATED APPLICATION

This application claims priority to Japanese Patent Application No. 2020-042690, filed on Mar. 12, 2020, the disclosure of which is hereby incorporated herein by reference in its entirety.

BACKGROUND

The present disclosure relates to a light source device, an optical lens, and a method of manufacturing an optical lens.

Optical lenses provided with anti-reflection films on their surfaces are used in various applications. The anti-reflection films reduce surface reflection of light, so that the transmittance can be enhanced. Japanese Patent Publication No. 2004-145003 discloses an objective lens provided with an anti-reflection film on its surface.

SUMMARY

An object of certain embodiments according to the present disclosure is to improve the transmittance of an optical lens provided with anti-reflection films on its surface.

A light source device in the present disclosure includes a condensing lens, a laser light source, a first anti-reflection film, and a second anti-reflection film. The condensing lens has a curved surface. The laser light source includes a plurality of laser elements configured to emit laser beams incident on different regions of the curved surface of the condensing lens. The first anti-reflection film and the second anti-reflection film are disposed in different regions of the curved surface. A reflectance characteristic of the first anti-reflection film is different from a reflectance characteristic of the second anti-reflection film.

An optical lens in the present disclosure includes a lens base, a first anti-reflection film and a second anti-reflection film. The lens base has a curved surface on which light is incident. The first anti-reflection film and the second anti-reflection film are disposed in different regions of the curved surface. A reflectance characteristic of the first anti-reflection film is different from a reflectance characteristic of the second anti-reflection film.

A method of manufacturing an optical lens in the present disclosure includes: providing a lens base having a curved surface serving as a light incident surface; forming a first anti-reflection film in a first region of the curved surface by using a first mask having a first opening pattern; and forming a second anti-reflection film in a second region of the curved surface different from the first region by using a second mask having a second opening pattern different from the first opening pattern, a reflectance characteristic of the second anti-reflection film being different from a reflectance characteristic of the first anti-reflection film.

According to illustrative embodiments in the present disclosure, the transmittance of an optical lens provided with anti-reflection films on its surface may be improved.

DETAILED DESCRIPTION

Embodiments of the present disclosure will be described below with reference to the accompanying drawings. The embodiments below are illustrative, and the light source device according to the present disclosure is not limited to the embodiments described below. For example, the numerical values, shapes, materials, steps, the order of the steps, and the like described regarding the embodiments below are only examples and can be modified in various ways as long as technical contradictions do not arise. The embodiments described below are only intended to give examples and can be combined in various ways as long as technical contradictions do not arise.

The dimensions, shapes, and the like of the components shown in the drawings may be exaggerated for ease of explanation, and may not represent the dimension, the shape, and the size relationship between components in an actual light source device or optical lens. The illustration of the components may be partly omitted to prevent the drawings from being too complicated.

In the description below, components having substantially the same function will be shown with the same reference numerals, and repeated descriptions of such components may be omitted. Terms representing particular directions or positions (such as "up/upper", "down/lower", "right", "left", and other terms containing the meanings of these terms) may be used. These terms are used merely for the sake of ease of explanation, representing relative directions or relative positions in the referenced drawings. As far as the relative directions or positions mentioned by the terms "upper", "lower", and the like designate the same directions or positions in the reference drawings, drawings other than shown in the present disclosure, actual products, and manufacturing equipment do not have to be the same arrangement as shown in the reference drawings.

Figure 1:
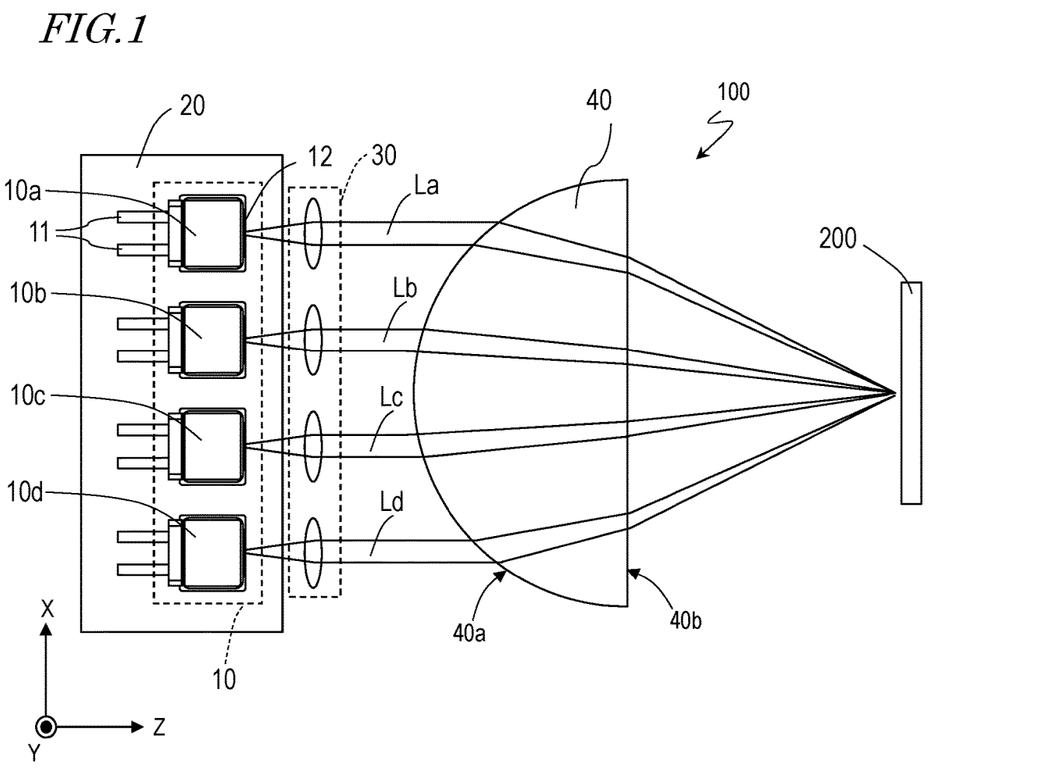
FIG. 1 schematically shows an example of the constitution of a light source device according to an illustrative embodiment in the present disclosure.

An example of the constitution of a light source device according to the present embodiment is described with reference to FIG. 1. FIG. 1 schematically shows the example of the constitution of a light source device 100 according to the present embodiment. In the drawing, the X-axis, the Y-axis, and the Z-axis orthogonal to one another are shown for reference.

The light source device 100 includes at least one laser light source 10, a heat dissipation plate 20, a collimating lens group 30, and a condensing lens 40. As described below, the light source device 100 can further include a wavelength conversion member, a diffusing member, and the like. Components such as the laser light source 10, the heat dissipation plate 20, the collimating lens group 30, and the condensing lens 40 can be accommodated in a casing (not shown) and modularized to constitute the light source device. The light source device 100 can emit a high-output laser beam and can be suitably used as, for example, a light source for a projector, a laser processing apparatus, or a lighting device.

The laser light source 10 includes a plurality of laser elements and illuminates different positions on a lens curved surface 40a (hereinafter referred to as a "curved surface") of the condensing lens 40 which serves as a light incident surface on which a plurality of laser beams is incident. That is, the laser elements respectively illuminate different regions of the curved surface 40a with laser beams. Each laser element in the present embodiment includes a laser diode (not shown) that emits a laser beam and a plurality of leads electrically connected to the laser diode, and the laser element is packaged. FIG. 1 schematically shows a pair of leads 11. Further, a photodiode for monitoring the output of the laser beam, a Zener diode as a protective element, and the like can be mounted in the package. The package can have a window 12 that transmits the laser beam emitted from the laser diode. The laser beam transmitted through the window 12 is emitted toward the curved surface 40a of the condensing lens 40. For example, $CO_2$ lasers, fiber lasers, YAG lasers, $YVO_4$ lasers, or the like other than semiconductor laser elements can be used as the laser elements.

In the example of the constitution shown in FIG. 1, the laser light source 10 includes four laser elements 10a, 10b, 10c, and 10d. The four laser elements 10a, 10b, 10c, and 10d are aligned along the X direction on the heat dissipation plate 20 and respectively emit laser beams La, Lb, Lc, and Ld in the Z direction. The size of each laser element in the X direction can be, for example, 0.05 mm or more and 1 mm or less, the size in the Z direction can be, for example, 0.1 mm or more and 5 mm or less, and the height in the Y direction can be, for example, 0.05 mm or more and 0.2 mm or less. The interval between two adjacent laser elements can be, for example, 5 mm or more and 50 mm or less. The interval in the present embodiment is about 11 mm. The interval represents the distance between the central axes of laser beams of the two adjacent laser elements.

In the present embodiment, the laser elements have the same peak emission wavelength. However, among the laser elements, at least one peak emission wavelength can differ from the other peak emission wavelengths depending on the intended use. Alternatively, the laser elements can have different peak emission wavelengths.

The four laser elements 10a, 10b, 10c, and 10d shown in FIG. 1 have the same peak emission wavelength. For example, laser elements that radiate blue light, laser elements that radiate green light, and laser elements that radiate red light can be employed as the individual laser elements. Alternatively, laser elements that radiate other light, such as near-infrared light and ultraviolet light, can be employed.

In the present specification, blue light refers to light with a peak emission wavelength within the range of 420 nm to 494 nm. Green light refers to light with a peak emission wavelength within the range of 495 nm to 570 nm. Red light refers to light with a peak emission wavelength within the range of 605 nm to 750 nm.

Examples of the laser elements that emit blue light or the laser elements that emit green light include laser elements including a nitride semiconductor. Examples of the nitride semiconductor include GaN, InGaN, and AlGaN. Examples of the laser elements that emit red light include elements including an InAlGaP, GaInP, GaAs, or AlGaAs semiconductor.

Laser beams radiated from the individual laser elements each have divergence and form an elliptic far-field pattern (hereinafter referred to as "FFP") in a plane parallel to an emission end surface of the laser beam. The FFP is specified by the light intensity distribution of the laser beam at a position away from the emission end surface. A portion having intensities of $1/e^2$ or more of the peak intensity in this light intensity distribution can be referred to as a beam section.

The heat dissipation plate 20 in the present embodiment has a plurality of recesses (not shown). The laser elements each of which has been packaged are directly fixed to the recesses or fixed to the recesses with grease or solder therebetween. The individual laser elements do not have to be protected by the packages but can be mounted on the heat dissipation plate 20 in an uncovered state. In this case, the heat dissipation plate 20 can have a wiring layer electrically connected to a plurality of laser elements. The laser elements can be connected in series by electrically connecting one of the pair of leads 11 of each laser element to one of the pair of leads 11 of an adjacent laser element through, for example, a wire.

The heat dissipation plate 20 efficiently dissipates heat generated from the laser elements. The heat dissipation plate 20 can be fixed to the casing with, for example, a heat sink (not shown) therebetween. The heat sink can further enhance the heat dissipation performance. In order to further enhance the heat dissipation performance, the heat dissipation plate 20 is preferably formed of a material with a thermal conductivity higher than the thermal conductivity of the packages of the laser elements. For example, a ceramic material such as AlN, SiC, and SiN or metal including at least one selected from the group consisting of Cu, Al, Ag, Fe, Ni, Mo, Cu, W, and CuMo is used for the material.

The collimating lens group 30 includes a plurality of collimating lenses that respectively collimate a plurality of laser beams emitted from a plurality of laser elements. The collimating lens group 30 is disposed on the optical paths of the laser beams between the laser light source 10 and the condensing lens 40. In the example shown in FIG. 1, the collimating lens group 30 includes four collimating lenses that collimate the laser beams La, Lb, Lc, and Ld respectively emitted from the four laser elements 10a, 10b, 10c, and 10d. Each lens of the collimating lens group 30 can be formed of a glass or plastic lens. For example, the collimating lens can be fixed to the inner wall of the casing or the heat dissipation plate 20 while being supported by a lens holder (not shown).

The condensing lens 40 is a spherical or aspherical lens that condenses the laser beams collimated by the collimating lens group 30. The condensing lens 40 combines a plurality of laser beams to condense the beams on a point. The condensing lens 40 can be a cylindrical lens having a major axis in the Y-axis direction. The effective diameter of the condensing lens 40 depends on the size, number, and/or the arrangement of the laser elements of the laser light source 10 and can be about 48 mm in the example shown in FIG. 1. The condensing lens 40 has the curved surface 40a on which light is incident. The condensing lens 40 can be a glass or plastic lens. The condensing lens 40 is preferably a glass lens in consideration of heat resistance to high-output laser beams. For example, the glass lens can be manufactured by glass molding technique, and the plastic lens can be manufactured by injection molding technique.

A plurality of anti-reflection films are disposed in different regions of the curved surface 40a. The different regions of the curved surface 40a are specified by, for example, local coordinates on the curved surface 40a in a virtual coordinate system, and the local coordinates are represented by, for example, the position of the center of gravity of each region. The anti-reflection films in the present embodiment are dielectric films. The anti-reflection films can each have a fine protrusions and depressions, such as a moth eye structure, smaller than the wavelength. The reflectance can be controlled by interference of light on an optical thin film by adjusting the refractive index of the dielectric film, so that the anti-reflection effect may be obtained. Examples of a dielectric material include $TiO_2$, $Ta_2O_5$, $Al_2O_3$, $SiO_2$, and $MgF_2$.

The anti-reflection films formed on the curved surface 40a reduce reflection of incident laser beams at the curved surface 40a, so that the light transmittance can be enhanced. The structure and reflectance characteristics of the anti-reflection films in the present disclosure will be described below in detail. In order to enhance the light transmittance, it is preferable that an anti-reflection film be also formed on a lens surface 40b of the condensing lens 40 from which light exits, in addition to the curved surface 40a on which light is incident.

As described above, the light source device according to the present embodiment can be used as, for example, a light source for a laser processing apparatus. The laser processing of a metal material can be performed by placing a workpiece 200 at the focal point of the condensing lens 40. For example, in the case in which a metal such as copper is to be processed, it is desirable that the peak emission wavelength of the laser elements fall within the blue or blue-violet range in order to enhance the absorptivity of the metal. The output of the laser beams combined by the condensing lens 40 is about equal to the output of the laser beam emitted from each laser element multiplied by the number of the laser elements. The output of the laser light source 10 can be enhanced by increasing the number of laser elements to be used.

Figure 2:
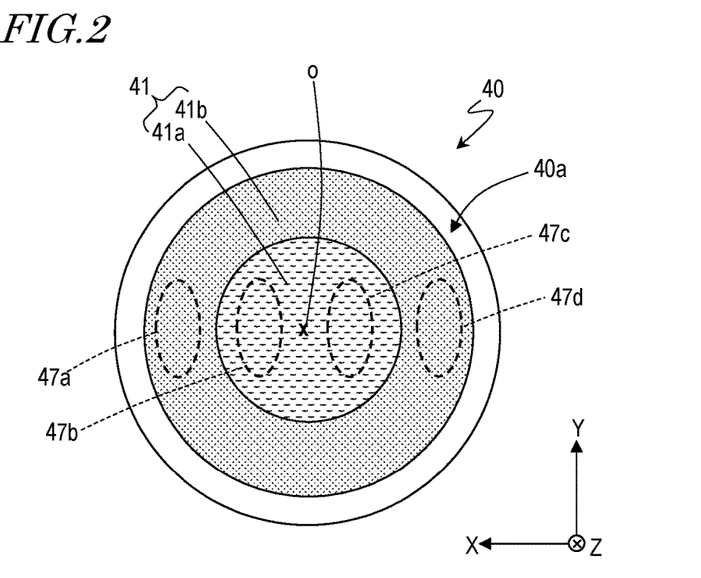
FIG. 2 schematically shows an example of a plurality of anti-reflection films concentrically disposed on a curved surface of a condensing lens.

The structure and the reflectance characteristics of the anti-reflection films disposed on the curved surface of the condensing lens are described in detail with reference to FIG. 2 to FIG. 5. FIG. 2 schematically shows an example of a plurality of anti-reflection films 41 concentrically disposed on the curved surface 40a of the condensing lens 40. In FIG. 2, broken lines indicate a plurality of irradiated regions of the curved surface 40a of the condensing lens 40 irradiated with the laser beams emitted from the laser elements. The shape of each irradiated region irradiated with a laser beam corresponds to the FFP. A center point o in the drawings is the intersection point between the curved surface 40a and the optical axis of the lens.

The anti-reflection films 41 are separately disposed at different positions on the curved surface 40a. The reflectance characteristic varies in the radial direction from the optical axis of the condensing lens 40 along the curved surface 40a. In the present embodiment, the anti-reflection films 41 have different reflectance characteristics according to the distance from the optical axis of the condensing lens 40. The anti-reflection films 41 include a first anti-reflection film 41a and a second anti-reflection film 41b located outward of the first anti-reflection film 41a in the radial direction of the condensing lens 40. In the example shown in FIG. 2, the first anti-reflection film 41a and the second anti-reflection film 41b are concentrically or annularly disposed on the curved surface 40a. Specifically, the first anti-reflection film 41a is disposed in a region of the curved surface 40a where the center point o is included, and the second anti-reflection film 41b surrounding the first anti-reflection film 41a is disposed outside that region.

The first anti-reflection film 41a has a circular shape in the example shown in the drawings, but this shape is not limited circular. For example, an elliptic or rectangular shape can be employed. A second irradiated region 47b of the first anti-reflection film 41a is irradiated with the laser beam Lb emitted from the second laser element 10b and collimated by the collimating lens, and a third irradiated region 47c of the first anti-reflection film 41a is irradiated with the laser beam Lc emitted from the third laser element 10c and collimated by the collimating lens. On the other hand, a first irradiated region 47a of the second anti-reflection film 41b is irradiated with the laser beam La emitted from the first laser element 10a and collimated by the collimating lens, and a fourth irradiated region 47d of the second anti-reflection film 41b is irradiated with the laser beam Ld emitted from the fourth laser element 10d and collimated by the collimating lens.

Figure 3:
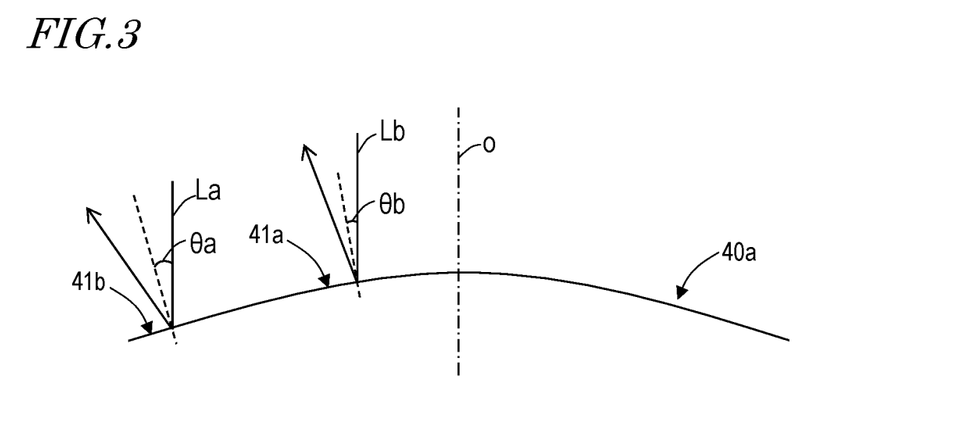
FIG. 3 schematically shows laser beams incident on the anti-reflection films.

The incidence angle dependence of the reflectance of the anti-reflection films is described with reference to FIG. 3 and FIG. 4. FIG. 3 schematically shows the laser beams incident on the anti-reflection films. In FIG. 3, the optical axis (beam center) of the laser beam La emitted from the first laser element 10a and incident on the second anti-reflection film 41b, and the optical axis of the laser beam Lb emitted from the second laser element 10b and incident on the first anti-reflection film 41a are represented by straight lines to simplify the illustration.

As shown in FIG. 3, an incidence angle θb of the laser beam Lb emitted from the second laser element 10b to the first anti-reflection film 41a that is located in the inner portion on the curved surface 40a is smaller than an incidence angle θa of the laser beam La emitted from the first laser element 10a to the second anti-reflection film 41b that is located in the outer portion on the curved surface 40a. As described above, the incidence angle of a laser beam incident on the anti-reflection films varies according to the distance from the optical axis of the condensing lens. More specifically, the incidence angle of a laser beam incident on the anti-reflection films increases with increasing distance from the optical axis of the condensing lens.

Figure 4:
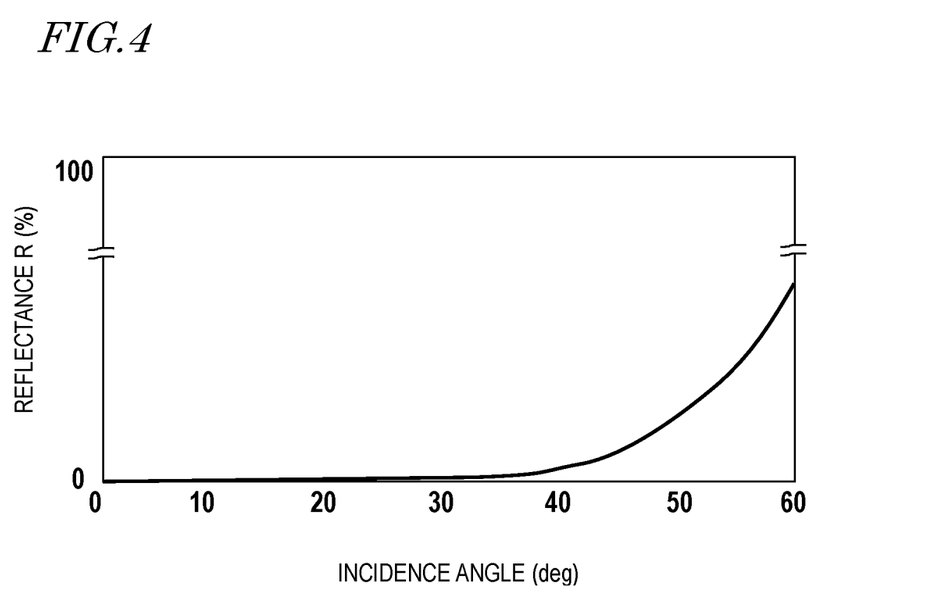
FIG. 4 is a graph showing an example of the incidence angle dependence of the reflectance at the anti-reflection films with respect to light with a wavelength of 550 nm.

FIG. 4 is a graph showing an example of the incidence angle dependence of the reflectance at the anti-reflection films with respect to light with a wavelength of 550 nm. The drawing shows the incidence angle dependence that has been suitably adjusted such that the reflectance is lowest at an incidence angle of 0°. Incident beams are reflected by or transmitted through the anti-reflection films according to the incidence angle even if the beams have the same wavelength. It is assumed that the case in which the laser elements of the laser light source 10 have the same peak emission wavelength and in which the anti-reflection films with a uniform thickness are evenly disposed on the curved surface 40a of the condensing lens 40. As described above, the reflectance of the laser beam Lb incident on the anti-reflection film located in the inner portion on the curved surface 40a differs from the reflectance of the laser beam La incident on the anti-reflection film located in the outer portion because the incidence angle of the laser beam incident on the anti-reflection films varies according to the distance from the optical axis of the condensing lens. In the case in which the reflectance is suitably adjusted on the basis of the laser beam Lb, the reflectance at a relatively large incidence angle θa is larger than the reflectance at a relatively small incidence angle θb, so that the laser beam La is more likely to be reflected by the anti-reflection films than the laser beam Lb. Accordingly, a decrease in the transmittance at the anti-reflection film located in the outer portion on the curved surface 40a may lead to a decrease in the overall luminous efficacy of the light source device.

In the present embodiment, the first anti-reflection film 41a and the second anti-reflection film 41b have different reflectance characteristics depending on the distance from the optical axis of the condensing lens 40. Specifically, the first anti-reflection film 41a has a thickness different from and a refractive index different from a thickness and a refractive index of the second anti-reflection film 41b in different positions on the curved surface 40a. The reflectance of the second anti-reflection film 41b is suitably adjusted such that the reflectance when the laser beam La is obliquely incident on the second anti-reflection film 41b is lower than the reflectance when the laser beam La is perpendicularly incident (at an incidence angle of) 0°. The incidence angle of an oblique laser beam depends on the curvature of the curved surface 40a, the position of the irradiated region of the curved surface 40a irradiated with the laser beam, and the like. The second anti-reflection film 41b has reflectance characteristics suited to the incidence angle of the laser beam.

As for the first anti-reflection film 41a, for example, the reflectance is suitably adjusted such that the reflectance is low at an incidence angle of 0°. Similarly to the second anti-reflection film 41b, the reflectance can be suitably adjusted such that the reflectance when the laser beam Lb is obliquely incident on the first anti-reflection film 41a at a specific incidence angle is lower than the reflectance when the laser beam Lb is perpendicularly incident.

Figure 5:
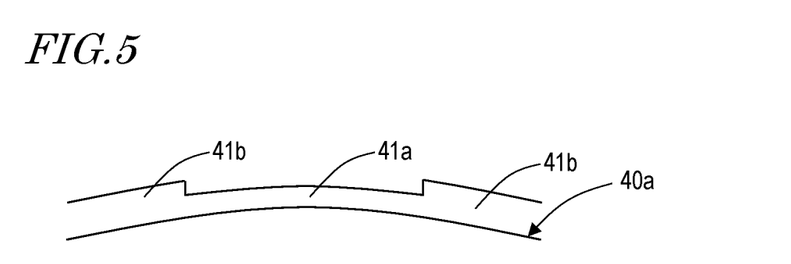
FIG. 5 schematically shows a first anti-reflection film and a second anti-reflection film that are disposed on the curved surface of the condensing lens, the second anti-reflection film having a thickness different from a thickness of the first anti-reflection film.

FIG. 5 schematically shows the first anti-reflection film 41a and the second anti-reflection film 41b that are disposed on the curved surface 40a. The second anti-reflection film 41b has a thickness different from a thickness of the first anti-reflection film 41a. In the example shown in FIG. 5, the thickness of the first anti-reflection film 41a with which the incidence angle θb is relatively small is smaller than the thickness of the second anti-reflection film 41b with which the incidence angle θa is relatively large. The reflectance characteristic changes at the boundary between the first anti-reflection film 41a and the second anti-reflection film 41b. By adjusting the thickness of each of the first anti-reflection film 41a and the second anti-reflection film 41b to a desired thickness, a high transmittance, such as 99.8% or more, can be obtained for each anti-reflection film.

Reference is made to FIG. 2 again. In the present embodiment, the first, second, third, and fourth irradiated regions 47a, 47b, 47c and 47d do not overlap with each other. In particular, it is preferable to irradiate the curved surface 40a with the laser beams La and Lb such that the first irradiated region 47a does not overlap with the second irradiated region 47b and to irradiate the curved surface 40a with the laser beams Lc and Ld such that the third irradiated region 47c does not overlap with the fourth irradiated region 47d. The transmittance at each anti-reflection film can be enhanced by respectively irradiating, with a plurality of laser beams, a plurality of regions to-be irradiated of the first anti-reflection film 41a and the second anti-reflection film 41b that have reflectance characteristics respectively conforming to the incidence angles of the laser beams.

Figure 6:
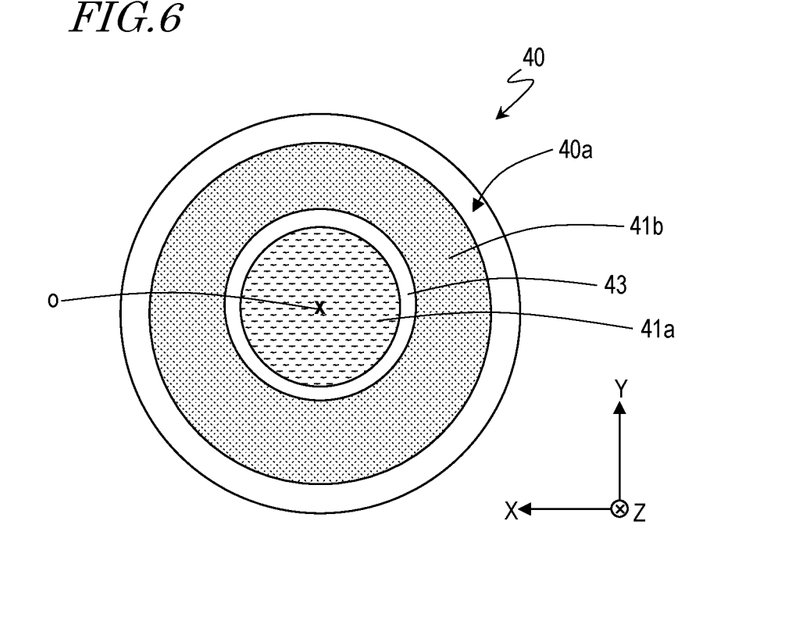
FIG. 6 schematically shows another example of a plurality of anti-reflection films concentrically disposed on the lens curved surface of the condensing lens.

FIG. 6 schematically shows another example of a plurality of anti-reflection films 41 concentrically disposed on the curved surface 40a of the condensing lens 40. As shown in the drawing, the anti-reflection films 41 are disposed on the curved surface 40a as being spaced apart from each other. For example, the first anti-reflection film 41a and the second anti-reflection film 41b are disposed on the curved surface 40a such that first and second anti-reflection films are spaced apart from each other with a gap 43 therebetween. In the gap 43, no anti-reflection film is formed, and the condensing lens 40 is exposed. The width of the gap 43 corresponds to, for example, a beam diameter and is about 3.0 mm in the present embodiment. The gap 43 between the first anti-reflection film 41a and the second anti-reflection film 41b may prevent the overlap between the first irradiated region 47a and the second irradiated region 47b and the overlap between the third irradiated region 47c and the fourth irradiated region 47d on the anti-reflection films. That is, irradiation of the first anti-reflection film 41a with the laser beam La may be prevented, and irradiation of the second anti-reflection film 41b with the laser beam Lb may be prevented. Likewise, irradiation of the second anti-reflection film 41b with the laser beam Lc may be prevented, and irradiation of the first anti-reflection film 41a with the laser beam Ld may be prevented.

Figure 7:
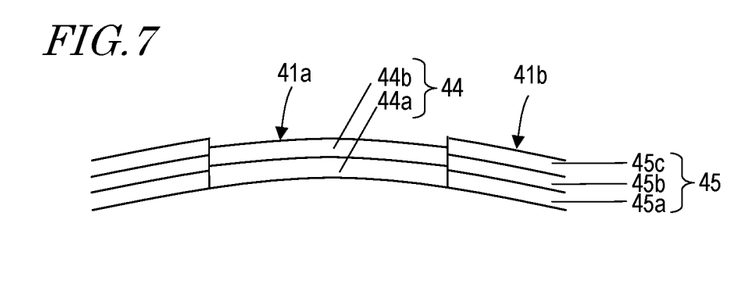
FIG. 7 schematically shows an example of the structure of anti-reflection films formed of multilayer films.

FIG. 7 schematically shows an example of the structure of anti-reflection films formed of multilayer films. Each of the first anti-reflection film 41a and the second anti-reflection film 41b in the present embodiment can have a multilayer film structure. The first anti-reflection film 41a is formed of a first multilayer film 44, and the second anti-reflection film 41b is formed of a second multilayer film 45. The thickness of each layer of the first multilayer film 44 differs from the thickness of each layer of the second multilayer film 45. A multilayer film having desired reflectance characteristics is formed by alternately layering two or more types of the thin-film materials described above.

The thickness of each layer of the first multilayer film 44 and the second multilayer film 45 is suitably adjusted so as to conform to the desired reflectance characteristics and can be adjusted to, for example, $\lambda/2$, $\lambda/4$, or $\lambda/8$, where $\lambda$ is the wavelength of a laser beam. The first multilayer film 44 and the second multilayer film 45 can be formed of the same thin-film material. In this case, the thickness of a single layer of the first multilayer film 44 can differ from the thickness of a layer of the second multilayer film 45 formed of the same thin-film material. The reflectance of the anti-reflection films can be controlled by employing multilayer film structures and adjusting the thickness of each layer of the multilayer films.

The number of layers of the first multilayer film 44 can differ from the number of layers of the second multilayer film 45. Each multilayer film can include two or more layers. The number of layers of the multilayer film is appropriately selected according to the specifications of the lens. In the example shown in FIG. 7, the first multilayer film 44 includes two layers 44a and 44b, while the second multilayer film 45 includes three layers 45a, 45b, and 45c. The reflectance can be controlled by changing the number of layers of the multilayer film to adjust the thickness of each anti-reflection film.

The refractive index distribution of the first multilayer film 44 can differ from the refractive index distribution of the second multilayer film 45. The refractive index distribution is specified by the refractive index of each layer of each multilayer film. For example, a desired refractive index distribution in the thickness direction of the multilayer film can be obtained by alternately layering a high refractive index material and a low refractive index material repeatedly. The reflectance can be controlled by changing the refractive index distribution.

Figure 8:
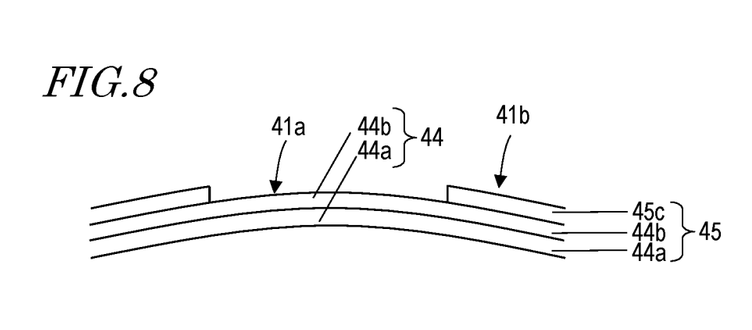
FIG. 8 schematically shows another example of the structure of anti-reflection films formed of multilayer films.

FIG. 8 schematically shows another example of the structure of anti-reflection films formed of multilayer films. The first multilayer film 44 and the second multilayer film 45 can include at least one common layer. More specifically, the first multilayer film 44 and the second multilayer film 45 can include at least one common layer containing the same material and having the same thickness. In the example shown in the drawing, the first multilayer film 44 and the second multilayer film 45 both include the two common layers 44a and 44b. Using the common layers can simplify the forming process of the multilayer films.

Figure 9:
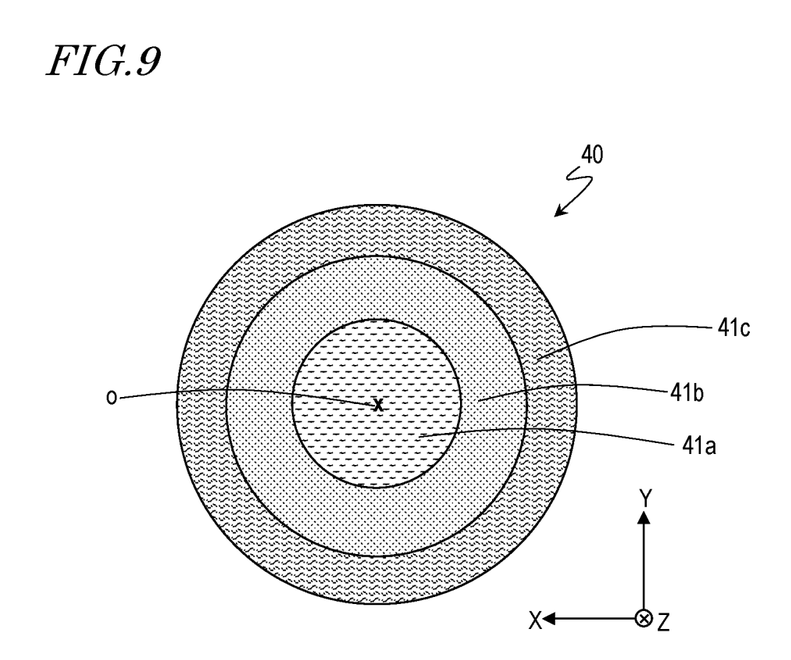
FIG. 9 schematically shows still another example of a plurality of anti-reflection films concentrically disposed on the lens curved surface of the condensing lens.

FIG. 9 schematically shows still another example of a plurality of anti-reflection films 41 concentrically disposed on the curved surface 40a of the condensing lens 40. The anti-reflection films 41 can further include a third anti-reflection film 41c in addition to the first anti-reflection film 41a and the second anti-reflection film 41b. The third anti-reflection lens 41c surrounds the second anti-reflection film 41b. The anti-reflection films 41 can include still another anti-reflection film. For example, a laser light source 10 including six laser elements aligned along the X direction can be suitably combined with the condensing lens 40 shown in FIG. 9. A high-output light source device with an improved transmittance at the anti-reflection films can be obtained by respectively irradiating, with a plurality of laser beams, a plurality of regions to-be irradiated of a plurality of anti-reflection films having reflectance characteristics respectively conforming to the incidence angles of the laser beams.

Figure 10A:
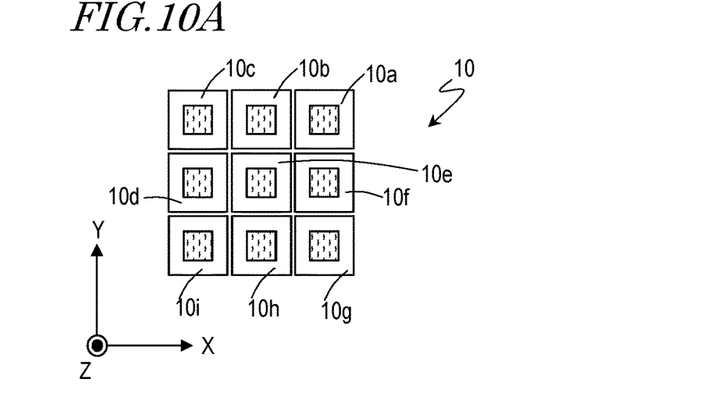
FIG. 10A schematically shows an example of the constitution of nine laser elements arranged in the X direction and the Y direction.
Figure 10B:
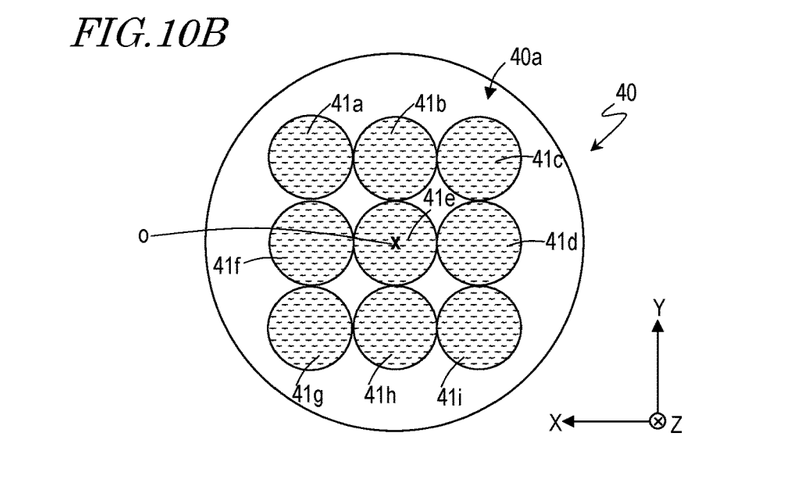
FIG. 10B schematically shows an example of nine circular anti-reflection films arranged in the X direction and the Y direction.
Figure 10C:
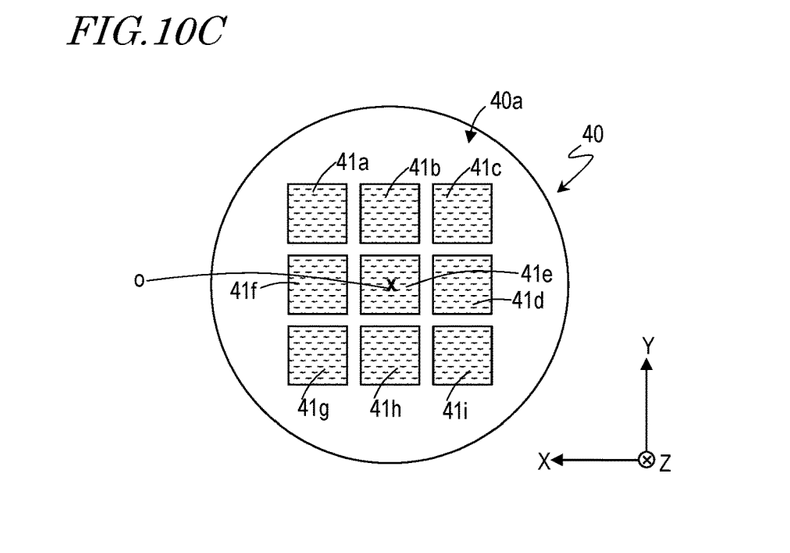
FIG. 10C schematically shows an example of nine rectangular anti-reflection films arranged in the X direction and the Y direction.

Generally, it is possible to determine the arrangement of a plurality of laser elements in the laser light source 10 and then dispose a plurality of anti-reflection films at different positions on the curved surface 40a to conform to the arrangement. FIG. 10A schematically shows an example of the constitution of nine laser elements two-dimensionally arranged in the XY plane. FIG. 10B schematically shows an example of nine circular anti-reflection films arranged in the X direction and the Y direction. FIG. 10C schematically shows an example of nine rectangular anti-reflection films arranged in the X direction and the Y direction.

The laser elements can be two-dimensionally arranged in the plane. In the example shown in FIG. 10A, the laser light source 10 includes nine laser elements 10a, 10b, 10c, 10d, 10e, 10f, 10g, 10h, and 10i two-dimensionally arranged in the XY plane. The three laser elements 10d, 10e, and 10f are located above the three laser elements 10g, 10h, and 10i, and the three laser elements 10a, 10b, and 10c are further located above the three laser elements 10d, 10e, and 10f. The laser elements two-dimensionally arranged can be respectively fixed in, for example, a plurality of recesses or a plurality of through holes (not shown) two-dimensionally arranged in the plate-shaped heat dissipation plate.

In the example shown in FIG. 10B, a first anti-reflection film 41a, a second anti-reflection film 41b, a third anti-reflection film 41c, a fourth anti-reflection film 41d, a fifth anti-reflection film 41e, a sixth anti-reflection film 41f, a seventh anti-reflection film 41g, an eighth anti-reflection film 41h, and a ninth anti-reflection film 41i are disposed on the curved surface 40a. Adjacent anti-reflection films are in contact with each other in FIG. 10B, but the anti-reflection films can be spaced apart from each other. Each anti-reflection film has a circular shape as shown in FIG. 10B, or a rectangular shape as shown in FIG. 10C. The fifth anti-reflection film 41e is disposed in a region including the center point o on the curved surface 40a, and the first anti-reflection film 41a, the second anti-reflection film 41b, the third anti-reflection film 41c, the fourth anti-reflection film 41d, the sixth anti-reflection film 41f, the seventh anti-reflection film 41g, the eighth anti-reflection film 41h, and the ninth anti-reflection film 41i are disposed to surround the fifth anti-reflection film 41e.

For example, the second anti-reflection film 41b, the fourth anti-reflection film 41d, the sixth anti-reflection film 41f, and the eighth anti-reflection film 41h are located at the same distance from the optical axis and can therefore have the same reflectance characteristics. The first anti-reflection film 41a, the third anti-reflection film 41c, the seventh anti-reflection film 41g, and the ninth anti-reflection film 41i are located at the same distance from the optical axis and can therefore have the same reflectance characteristics. The eight anti-reflection films surrounding the fifth anti-reflection film 41e can all have the same reflectance characteristics. As described above, the anti-reflection films do not necessarily have to have reflectance characteristics proportional to the distance from the optical axis.

The laser light source 10 shown in FIG. 10A can be suitably combined with the condensing lens 40 shown in FIG. 10B. In this case, the first anti-reflection film 41a, the second anti-reflection film 41b, the third anti-reflection film 41c, the fourth anti-reflection film 41d, the fifth anti-reflection film 41e, the sixth anti-reflection film 41f, the seventh anti-reflection film 41g, the eighth anti-reflection film 41h, and the ninth anti-reflection film 41i on the curved surface 40a are respectively irradiated with a plurality of laser beams emitted from the first laser element 10a, the second laser element 10b, the third laser element 10c, the fourth laser element 10d, the fifth laser element 10e, the sixth laser element 10f, the seventh laser element 10g, the eighth laser element 10h, and the ninth laser element 10i. A gap like a slit can be formed between two adjacent anti-reflection films as shown in FIG. 10C.

Figure 11A:
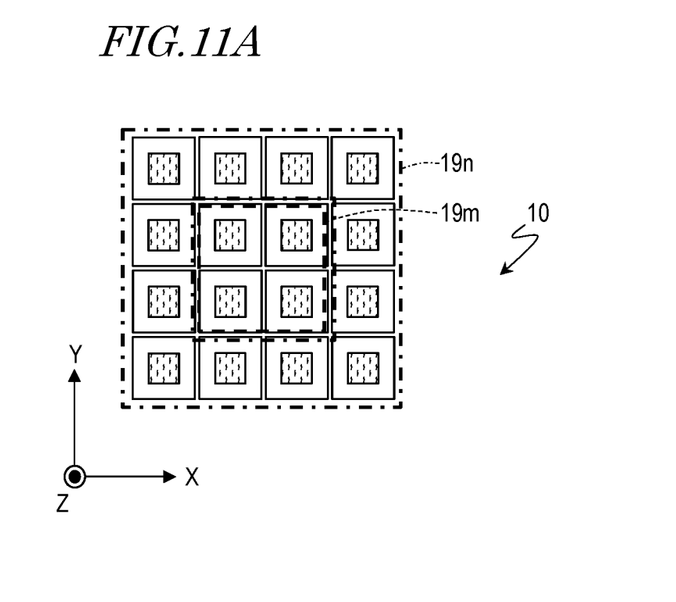
FIG. 11A schematically shows an example of the constitution of 16 laser elements arranged in the X direction and the Y direction.
Figure 11B:
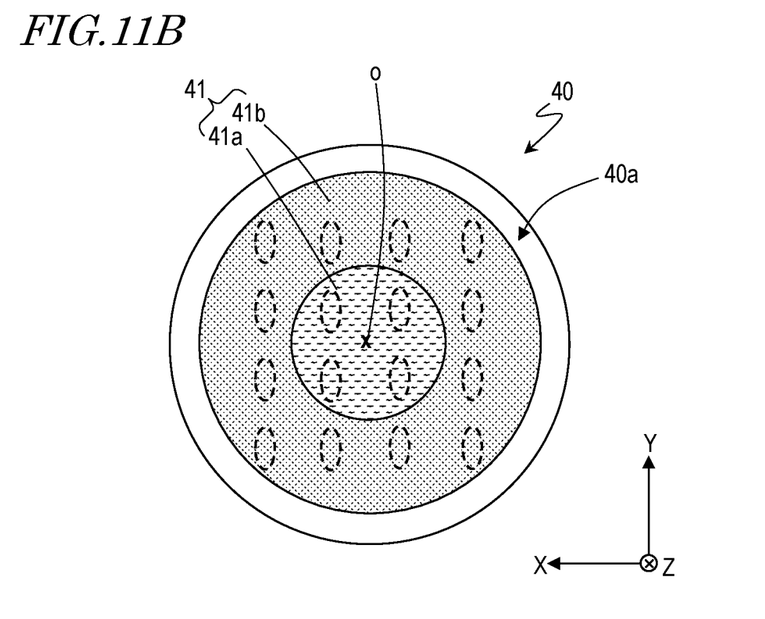
FIG. 11B schematically shows an example of the first anti-reflection film and the second anti-reflection film concentrically disposed on the lens curved surface of the condensing lens.

FIG. 11A schematically shows an example of the constitution of 16 laser elements two-dimensionally arranged in the XY plane. The laser light source 10 shown in FIG. 11A includes 16 laser elements two-dimensionally arranged in the XY plane. FIG. 11B schematically shows an example of the first anti-reflection film 41a and the second anti-reflection film 41b concentrically disposed on the curved surface 40a of the condensing lens 40. In FIG. 11B, broken lines indicate a plurality of irradiated regions of the curved surface 40a of the condensing lens 40 irradiated with a plurality of laser beams emitted from the laser elements.

The laser light source 10 shown in FIG. 11A can be suitably combined with the condensing lens 40 shown in FIG. 11B. In this case, the first anti-reflection film 41a on the curved surface 40a is irradiated with laser beams emitted from the four laser elements enclosed by a broken line 19m in FIG. 11A. The second anti-reflection film 41b on the curved surface 40a is irradiated with laser beams emitted from the 12 laser elements enclosed by dot-dash lines 19n in FIG. 11A. A plurality of irradiated regions do not overlap with each other.

Figure 12:
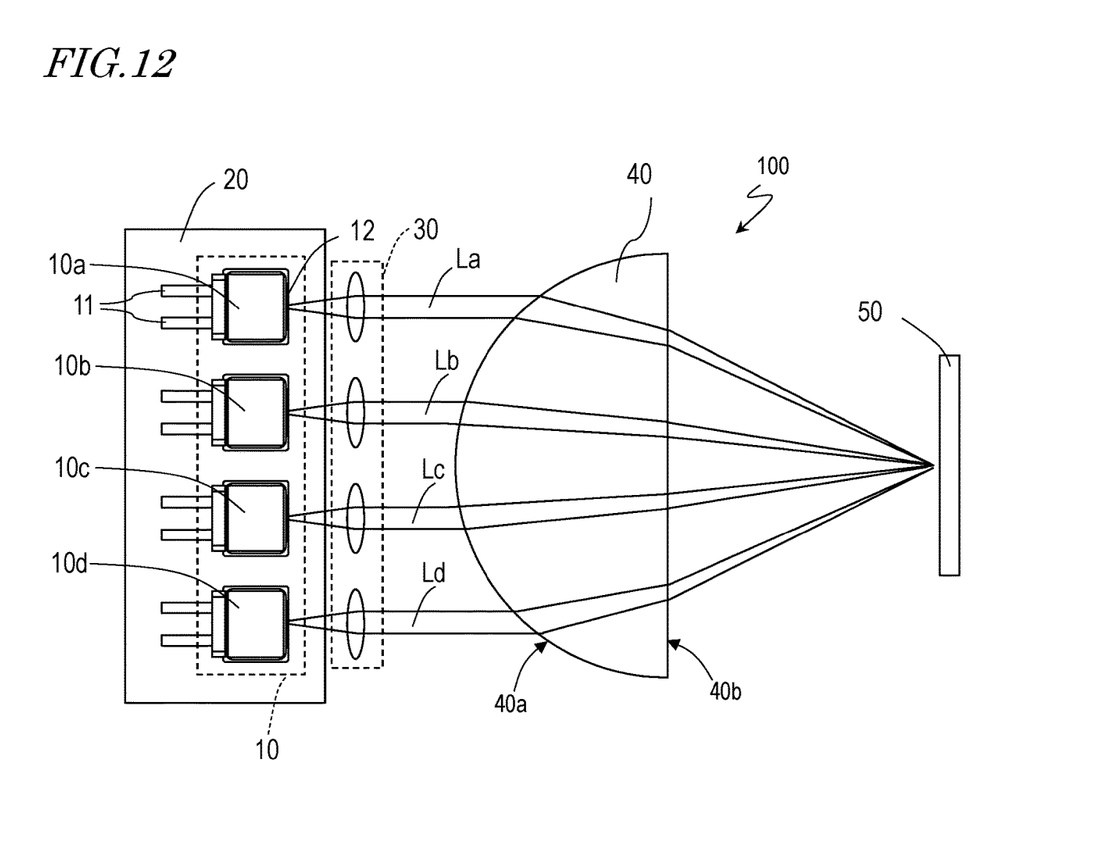
FIG. 12 schematically shows another example of the constitution of the light source device according to the illustrative embodiment in the present disclosure.

FIG. 12 schematically shows another example of the constitution of the light source device 100 according to the present embodiment. The light source device 100 can include a wavelength conversion member 50 at the focal point of the condensing lens 40.

The wavelength conversion member 50 can be formed of, for example, a material in which phosphor particles are dispersed in a ceramic, glass, or sapphire or a material in which a phosphor layer is disposed on a surface of a metal plate. The wavelength conversion member 50 absorbs at least a portion of laser beams emitted from laser elements and emits beams with a wavelength different from the wavelength of the beams emitted from the laser elements. For example, the wavelength conversion member 50 converts a portion of blue light emitted from the laser elements to emit yellow light. With such a structure, white light as a mixture of blue light that has been passed through the wavelength conversion member 50 and yellow light emitted from the wavelength conversion member 50 can be obtained.

Next, an example of a method of manufacturing an optical lens that can be used as the above-described condensing lens 40 is described with reference to FIG. 13A and FIG. 13B. In the present embodiment, anti-reflection films are formed on a curved surface of a lens by sputtering. A method of manufacturing an optical lens according to the present embodiment includes providing a lens base having a curved surface on which light is incident, forming a first anti-reflection film in a first region of the curved surface using a first mask having a first opening pattern, and forming a second anti-reflection film having a reflectance characteristic different from a reflectance characteristic of the first anti-reflection film, the second anti-reflection film being formed in a second region of the curved surface different from the first region by using a second mask having a second opening pattern different from the first opening pattern.

Figure 13A:
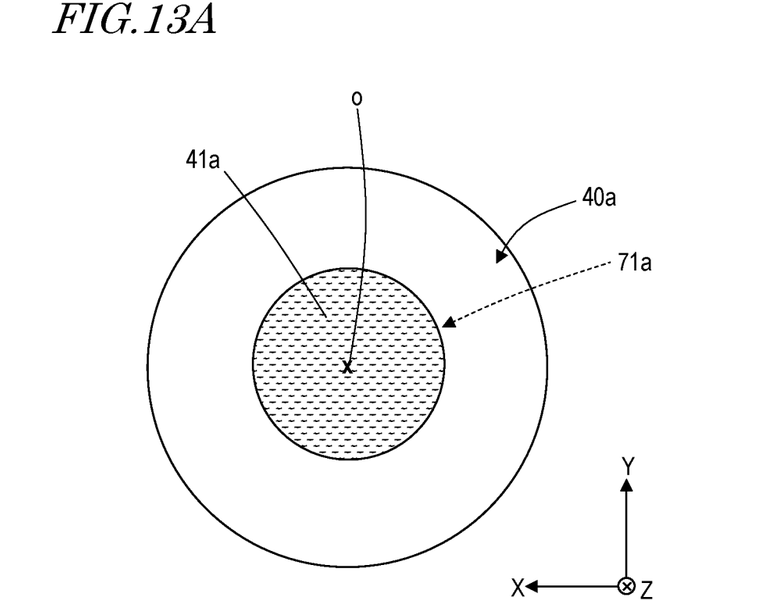
FIG. 13A schematically illustrates a manufacturing step of a method of manufacturing an optical lens.
Figure 13B:
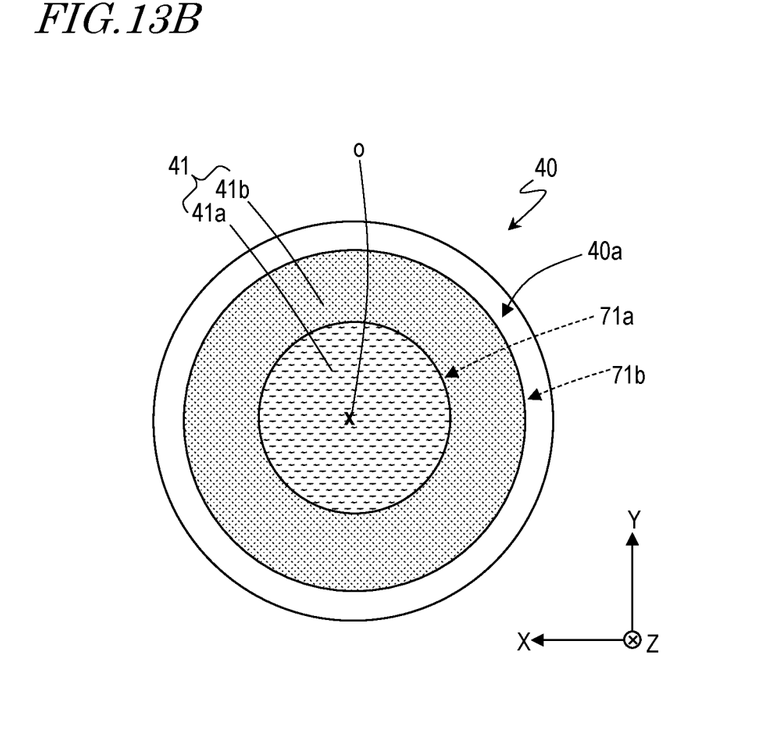
FIG. 13B schematically illustrates a manufacturing step of the method of manufacturing an optical lens.

Each of FIG. 13A and FIG. 13B schematically illustrates a manufacturing step of the method of manufacturing an optical lens. An example of a method of manufacturing a glass lens by glass molding will be described below.

Molds used for glass molding are provided. A glass material, such as a low-melting-point glass, is inserted between the molds, and the glass material is softened by heating. After that, the shape of a lens curved surface of the molds is transferred to the glass material by press molding. Cooling is performed after press molding, so that the lens base having the lens curved surface is obtained. Instead of the glass lens, a plastic lens base can be formed by melting a plastic resin material such as an epoxy resin and a silicone resin at a high temperature and injecting the plastic resin material into molds to transfer the shape of the lens curved surface. Alternatively, an optical lens of a desired shape can be produced by polishing or grinding a glass material or a lens base.

The first mask having the first opening pattern conforming to the shape of the first anti-reflection film 41a is provided. The first anti-reflection film 41a is formed in a first region 71a of the curved surface 40a including the center point o (i.e., an intersection point with the optical axis of the lens) using the first mask. The first mask is disposed on the lens base such that the center of the first opening pattern coincides with the center point o, and the circular first anti-reflection film 41a is formed in the first region 71a by, for example, sputtering as shown in FIG. 13A. For example, the first anti-reflection film 41a can be obtained by forming a multilayer film in which two or more types of thin-film materials are alternately layered.

The second mask having the second opening pattern conforming to the shape of the second anti-reflection film 41b is provided. The second anti-reflection film 41b is formed in a second region 71b of the curved surface 40a different from the first region 71a by using the second mask. In the example shown in FIG. 13B, the second region 71b is located outward of the first region 71a and surrounds the first region 71a. The second mask is disposed on the lens base such that the second opening pattern surrounds the first anti-reflection film 41a, and the second anti-reflection film 41b is formed in the second region 71b of the curved surface 40a by sputtering. The second anti-reflection film 41b has a reflectance characteristic different from the reflectance characteristic of the first anti-reflection film 41a. For example, the second anti-reflection film 41b can be obtained by forming a multilayer film in which two or more types of thin-film materials are alternately layered.

The optical lens having the curved surface 40a on which the first anti-reflection film 41a and the second anti-reflection film 41b are formed is obtained through the above steps.

The light source device in the present disclosure can be suitably used for, for example, a projector, a laser processing apparatus, or a lighting device.

The invention claimed is:

1. A light source device comprising:
   a condensing lens having a curved surface;
   a laser light source including a plurality of laser elements configured to emit laser beams incident on different regions of the curved surface of the condensing lens; and
   a first anti-reflection film and a second anti-reflection film disposed in different regions of the curved surface with the first anti-reflection film and the second anti-reflection film being spaced apart from each other with a gap therebetween so that no anti-reflection film is formed in the gap, a reflectance characteristic of the first anti-reflection film being different from a reflectance characteristic of the second anti-reflection film, wherein
   optical axes of the laser beams are parallel to an optical axis of the condensing lens.

2. The light source device according to claim 1, wherein the second anti-reflection film is located outward of the first anti-reflection film in a radial direction of the condensing lens, and
   a reflectance of the laser beams obliquely incident on the second anti-reflection film is lower than a reflectance of the laser beams perpendicularly incident on the second anti-reflection film.

3. The light source device according to claim 1, wherein a thickness of the first anti-reflection film is different from a thickness of the second anti-reflection film, and/or a refractive index of the first anti-reflection film is different from a refractive index of the second anti-reflection film.

4. The light source device according to claim 3, wherein the first anti-reflection film includes a first multilayer film, the second anti-reflection film includes a second multilayer film, and
a thickness of each layer of the first multilayer film is different from a thickness of each layer of the second multilayer film.

5. The light source device according to claim 4, wherein the first multilayer film includes at least one layer having a material and a thickness identical to a material and a thickness of one layer of the second multilayer film.

6. The light source device according to claim 3, wherein the first anti-reflection film includes a first multilayer film, the second anti-reflection film includes a second multilayer film, and
a refractive index distribution defined by a refractive index of a material of each layer of the first multilayer film is different from a refractive index distribution defined by a refractive index of a material of each layer of the second multilayer film.

7. The light source device according to claim 3, wherein the first anti-reflection film includes a first multilayer film, the second anti-reflection film includes a second multilayer film, and
a number of layers in the first multilayer film is different from a number of layers in the second multilayer film.

8. The light source device according to claim 1, wherein the first anti-reflection film and the second anti-reflection film are concentrically disposed on the curved surface.

9. The light source device according to claim 1, wherein the first anti-reflection film is spaced apart from the second anti-reflection film on the curved surface.

10. The light source device according to claim 1, further comprising
a wavelength conversion member disposed at a focal point of the condensing lens.

11. The light source device according to claim 1, wherein the plurality of laser elements have a same peak emission wavelength.

12. The light source device according to claim 1, further comprising
a third anti-reflection film disposed in a region of the curved surface different from regions where the first anti-reflection film and the second anti-reflection film are disposed.

13. The light source device according to claim 1, further comprising
one or more additional anti-reflection films disposed respectively in regions of the curved surface different from regions where the first anti-reflection film and the second anti-reflection film are disposed.

14. The light source device according to claim 13, wherein
a number of the plurality of laser elements is equal to a total number of the first anti-reflection film, the second anti-reflection film, and the one or more additional anti-reflection films, and
the first anti-reflection film, the second anti-reflection film, and the one or more additional anti-reflection films are respectively arranged to conform to an arrangement of the plurality of laser-elements.

15. The light source device according to claim 1, wherein the reflectance characteristic of the first anti-reflection film is set so that a reflectance of the laser beams perpendicularly incident on the first anti-reflection film is lower than a reflectance of the laser beams obliquely incident on the first anti-reflection film, and
the reflectance characteristic of the second anti-reflection film is set so that a reflectance of the laser beams obliquely incident on the second anti-reflection film is lower than a reflectance of the laser beams perpendicularly incident on the second anti-reflection film.

* * * * *